(12) United States Patent
Kaplan et al.

(10) Patent No.: US 11,842,227 B2
(45) Date of Patent: Dec. 12, 2023

(54) HYPERVISOR SECURE EVENT HANDLING AT A PROCESSOR

(71) Applicant: ADVANCED MICRO DEVICES, INC., Santa Clara, CA (US)

(72) Inventors: David Kaplan, Austin, TX (US); Jelena Ilic, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 400 days.

(21) Appl. No.: 16/712,190

(22) Filed: Dec. 12, 2019

(65) Prior Publication Data

US 2021/0109798 A1    Apr. 15, 2021

Related U.S. Application Data

(60) Provisional application No. 62/913,487, filed on Oct. 10, 2019.

(51) Int. Cl.
*G06F 9/54* (2006.01)
*G06F 9/455* (2018.01)
(Continued)

(52) U.S. Cl.
CPC .......... *G06F 9/542* (2013.01); *G06F 9/45533* (2013.01); *G06F 9/45558* (2013.01); *G06F 21/554* (2013.01); *G06F 21/53* (2013.01); *G06F 2009/45583* (2013.01); *G06F 2009/45587* (2013.01); *G06F 2221/033* (2013.01)

(58) Field of Classification Search
CPC combination set(s) only.
See application file for complete search history.

(56) References Cited

U.S. PATENT DOCUMENTS 10,824,349 B1 * 11/2020 Chan .................. G06F 3/0622
10,860,359 B2 * 12/2020 Tsirkin ................ G06F 9/45558
(Continued)

FOREIGN PATENT DOCUMENTS

EP         3457311 B1 *  2/2020  ......... G06F 12/0292

OTHER PUBLICATIONS

Xia et al., "Architecture Support for Guest-Transparent VM Protection from Untrusted Hypervisor and Physical Attacks", IEEE, 2013, pp. 1-6. (Year: 2013).*

(Continued)

*Primary Examiner* — Kenneth Tang

(57) ABSTRACT

A virtualized computing environment is protected from a malicious hypervisor by restricting the hypervisor's access to one or more portions of an event (interrupt or exception) handling pathway of a guest virtual machine, wherein the guest virtual machine includes both a secure layer to manage security for the guest and one or more non-secure layers to handle event processing. The hypervisor is restricted from providing normal exception information to the guest virtual machine (referred to simply as a "guest" herein), and instead is only permitted to provide an event signal to the secure layer of the guest. In response to the event signal, the secure layer of the guest accesses a specified region of memory for the event information, reviews the information, and provides the information to another, non-secure, layer of the guest for processing only if the event information complies with specified security protocols.

17 Claims, 5 Drawing Sheets

(51) Int. Cl.
    *G06F 21/55*     (2013.01)
    *G06F 21/53*     (2013.01)

(56) References Cited

U.S. PATENT DOCUMENTS

| | | | |
|---|---|---|---|
| 11,099,878 B2 * | 8/2021 | Sahita | G06F 9/455 |
| 2011/0197004 A1 * | 8/2011 | Serebrin | G06F 9/45558 710/267 |
| 2013/0174148 A1 | 7/2013 | Amit et al. | |
| 2015/0199514 A1 | 7/2015 | Tosa et al. | |
| 2016/0378522 A1 * | 12/2016 | Kaplan | G06F 9/45558 718/1 |
| 2017/0300430 A1 * | 10/2017 | Kataria | G06F 9/468 |
| 2018/0074871 A1 | 3/2018 | Bacher et al. | |
| 2018/0081829 A1 * | 3/2018 | Kaplan | G06F 21/6281 |
| 2018/0129619 A1 | 5/2018 | Neiger et al. | |
| 2018/0165224 A1 * | 6/2018 | Brown | G06F 21/57 |
| 2019/0220601 A1 * | 7/2019 | Sood | G06F 21/57 |
| 2020/0073689 A1 * | 3/2020 | Tsirkin | G06F 3/0673 |
| 2020/0134171 A1 * | 4/2020 | Li | G06F 21/51 |
| 2020/0285747 A1 * | 9/2020 | Borntraeger | G06F 9/45558 |

OTHER PUBLICATIONS

Jin et al., "H-SVM: Hardware-Assisted Secure Virtual Machines under a Vulnerable Hypervisor", IEEE Transactions on Computers, vol. 64, No. 10, Oct. 2015, pp. 2833-2846. (Year: 2015).*

Danisevskis et al., "Minimizing Event-Handling Latencies in Secure Virtual Machines", Jun. 4, 2018, arXiv, pp. 1-12. (Year: 2018).*

International Search Report and Written Opinion for counterpart Application No. PCT/US2020/055049, 8 pages.

International Preliminary report on Patentability dated Apr. 21, 2022 for PCT/US2020/055049, 5 pages.

Extended European Search Report issued in Application No. 20873774. 2, dated Sep. 19, 2023 7 pages.

* cited by examiner

HYPERVISOR SECURE EVENT HANDLING AT A PROCESSOR

CROSS REFERENCE TO RELATED APPLICATIONS

This application claims priority to the U.S. Provisional Patent Application Ser. No. 62/913,487 filed on Oct. 10, 2019 and entitled "VIRTUAL MACHINE INTERRUPT INJECTION RESTRICTIONS," which is hereby incorporated by reference in its entirety.

BACKGROUND

To enhance the efficient provision of computer services, some servers and other computer systems implement a virtualized computing environment. In such an environment, a host computer system concurrently executes multiple virtual machines, sometimes referred to as "guests" of the host computer system. To simplify the design and execution of the guests, the host computer system employs a hypervisor that manages provision of system hardware resources to the concurrently-executing guests. That is, the hypervisor manages provision of the hardware resources so that the hardware appears to each guest as if the guest is executing on its own, dedicated computer system. The guests can therefore employ standard operating systems, libraries, drivers, and other programs to interface with the system hardware. In addition, the hypervisor provides security for the guests by providing a layer of isolation between the different guests so that, for example, one guest cannot access private data associated with a different guest. However, in some cases the hypervisor itself provides an avenue for maliciously accessing guest data or otherwise improperly manipulating guest operations.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
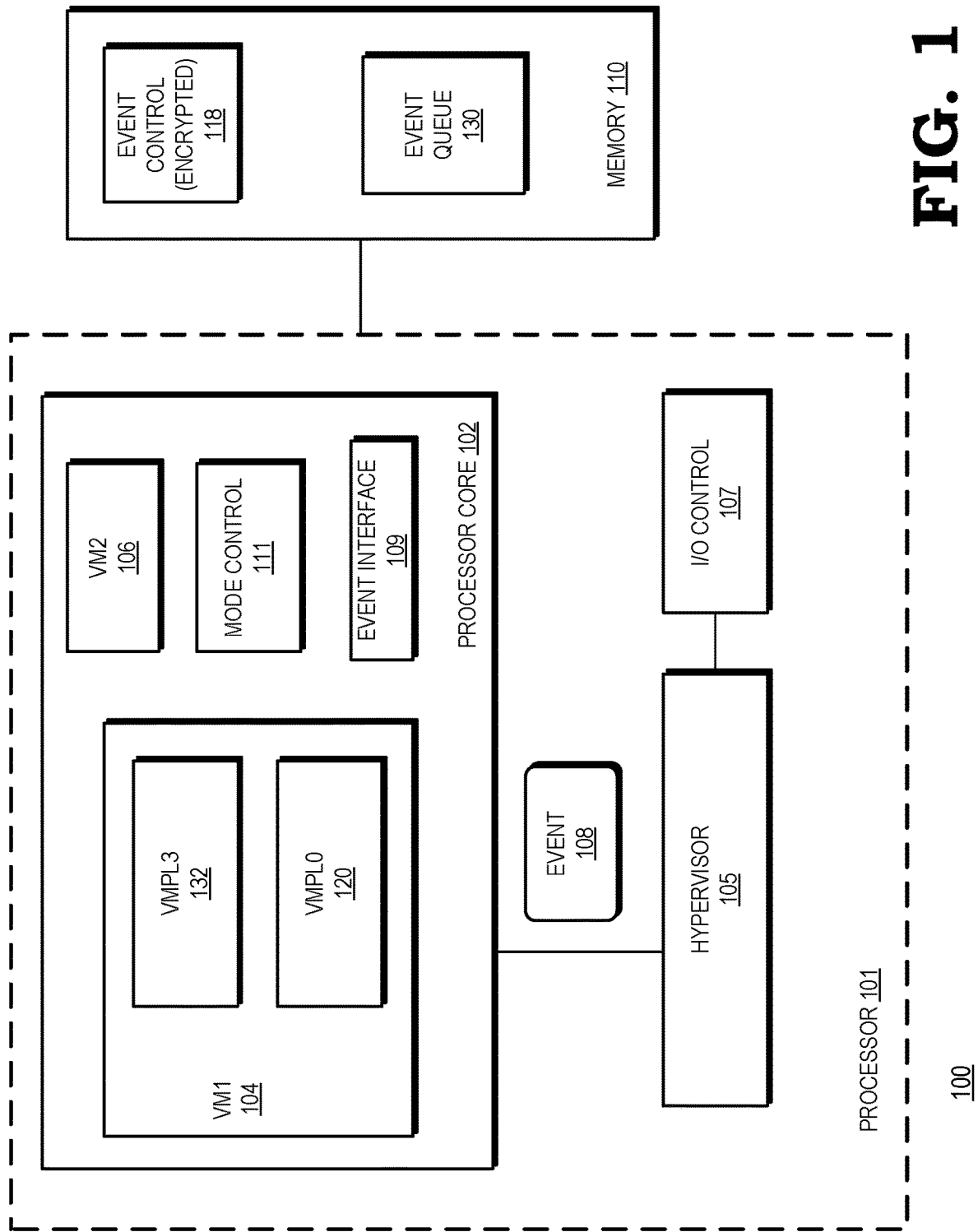
FIG. 1 is a block diagram of a computer system that isolates a hypervisor from event handling in accordance with some embodiments.

FIGS. 1-5 illustrate techniques for protecting virtualized computing environments from a malicious hypervisor by restricting the hypervisor's access to one or more portions of an event (interrupt or exception) handling pathway of a guest virtual machine, wherein the guest virtual machine includes both a secure layer to manage security for the guest and one or more non-secure layers to handle event processing. For example, in some embodiments, the hypervisor is restricted from providing normal exception information to the guest virtual machine (referred to simply as a "guest" herein), and instead is only permitted to provide an event signal to the secure layer of the guest. In response to the event signal, the secure layer of the guest accesses a specified region of memory for the event information, reviews the information, and provides the information to another, non-secure, layer of the guest for processing only if the event information complies with specified security protocols.

In other embodiments, the hypervisor is restricted from accessing event control information, such as task priority register (TPR) information, that is used by the guest to determine whether and how events are processed. The event control information is stored at an encrypted region of memory that is not accessible by the hypervisor. In particular, in response to receiving an indication of an event from the hypervisor, the secure layer of the guest stores event control information for the event at the encrypted region of memory, and an event interface of the processor uses the event control information to ensure that the event complies with specified event protocols, such as by ensuring that event priority information complies with the TPR information stored at the encrypted region. If the event information does not comply with the specified protocols, the corresponding event is not processed. Because the hypervisor is unable to access the encrypted region of memory, the hypervisor is unable to use the event control information to exploit the guest.

In some embodiments, the hypervisor is restricted both from providing exception information to unsecure layers of the guest, and from accessing event control information for the guest. Instead, the hypervisor signals an event to the secure layer of the guest, which in response reviews the associated event information for compliance with security protocols. In response to the event information complying with the security protocols, the secure layer provides the event information to the non-secure layer for processing, and stores event control information for the event at the encrypted region of memory. The non-secure layer accesses the event control information at the encrypted region of memory and uses the event control information to process the event.

By restricting the hypervisor's access to one or more of the event queue and the event control information, the guest is protected from malicious hypervisor attacks. To illustrate via an example, in some cases the event handling pathway of a guest relies on specified assumptions about system hardware behavior, such as an assumption that the system hardware will not generate or signal an interrupt that has a priority lower than the priority set by the TPR. However, because the hypervisor provides a layer of abstraction between the guest and the system hardware in a virtualized computing environment, a malicious hypervisor is able to generate events that violate the specified assumptions of device behavior, such as by providing an interrupt to a guest operating system having a lower priority than the TPR-set priority. These events, that would otherwise be prohibited, render secure data and other aspects of the guest vulnerable to unauthorized access or manipulation. Using the techniques described herein, a malicious hypervisor is prevented from exploiting a guest in this way, thus improving system security. Further, as described herein, in some embodiments the techniques are implemented with an existing event interface of a processor that is designed to receive and process events, thereby reducing the amount of software or hardware redesign required to implement the techniques.

FIG. 1 illustrates a block diagram of a processing system 100 that restricts hypervisor access to portions of an event handling pathway in accordance with some embodiments. The processing system 100 is a system that generally executes sets of computer instructions (e.g., computer programs) to carry out tasks on behalf of an electronic device. Accordingly, in different embodiments the processing system 100 is part of an electronic device such as a desktop or laptop computer, a server, a smartphone, a tablet, a game console, and the like. For purposes of description, the processing system 100 is assumed to be part of a server implementing a virtualized computing environment.

To support execution of computer instructions, the processing system 100 includes a processor 101 and a memory 110. The memory 110 is volatile memory, such as random-access memory (RAM), non-volatile memory, such as flash memory, or a combination thereof and stores data on behalf of the processor 101. In particular, as the processor 101 executes instructions, data (including instructions and operand data) is written to and read from the memory 110. It will be appreciated that while the memory 110 is illustrated as separate from the processor 101, in some embodiments all or a portion of the memory 110 is a part of the processor 101 and is incorporated in the same semiconductor die or semiconductor package as the processor 101.

The processor 101 is a processing device such a central processing unit (CPU) that includes one or more processor cores (e.g., processor core 102) and supporting circuitry to execute computer instructions. While the processor 101 is illustrated with a single processor core for simplicity, it will be appreciated that in some embodiments the processor 101 includes multiple processor cores.

In the depicted example, the circuitry supporting execution of instructions includes an input/output (I/O) control module 107 that provides an interface to one or more input/output devices, such as a keyboard. In some embodiments, the processor 101 includes additional supporting circuitry, such as one or more network interfaces to interface with a computer or communications network, one or more memory controllers to interface with a memory subsystem of the processor 101, and the like. In the course of executing their specified operations, the supporting circuitry generates conditions referred to herein as processor events (e.g., event 108).

As used herein, a processor event refers to an interrupt or exception signaled by a hardware module of a processor. For example, in response to a user manipulating an input/output device, the I/O control module 107 signals an interrupt to allow the processor 101 to respond to the user manipulation. Circuitry invokes the event in order to trigger execution of an event handler, such as an interrupt handler or an exception handler, to process the event. For example, in response to a user input at a keyboard or other input device, the I/O control module 107 invokes an interrupt event to trigger an interrupt handler that processes the user input, such as by storing data based on the user input at a specified buffer (not shown).

In order to trigger an exception handler in response to events signaled by the I/O control module 107 or other circuitry, the processor 101 executes specified operations in a specified sequence using designated circuitry, such as designated event queues and the like. The operations, sequence, and circuitry used by the processor 101 to handle processor events are referred to herein as the event processing path of the processor 101. To assist in handling events, the processor 101 includes an event interface 109. In some embodiments, the event interface 109 is a module that complies with a specified event interface standard, such as either of the Advanced Programmable Interrupt Controller (APIC) or x2APIC standards. Thus, in some embodiments, the event interface 109 is a module that receives signals indicating a processor event, such as interrupts and exceptions, identifies the source or vector of the event, and provides an indication of the event, along with any additional information about the event, to the processor core 102. In response, the processor core 102 invokes an event handler associated with the event. In particular, the processor core 102 uses the information provided by the event interface to select the event handler corresponding to the event, and executes the event handler, thereby handling the event.

As noted above, in a virtualized computing environment the event processing path provides a potential avenue of attack by malicious entities seeking unauthorized access to data or operations of the processor 101. To protect against such attacks, when executing a virtualized computing environment, the processor 101 restricts the hypervisor's access to one or more portions of the event processing path.

To illustrate, in the example of FIG. 1 the processor 101 implements a virtualized computing environment by concurrently executing two virtual machines VM1 104 and VM2 106, also referred to as guests 104 and 106. Each of the guests 104 and 106 is a virtual machine including one or more computer programs, such as an operating system, application programs, and the like. In some embodiments, to provide security from unauthorized access or manipulation, the guests 104 and 106 include multiple layers, with each layer having specified access protections to prevent unauthorized access. For example, the guest 104 has multiple layers, including a secure layer 120 (designated virtual machine privilege level 0 (VMPL0)) that is protected from access and manipulation by software at other layers and a non-secure layer 132 that performs event processing for the guest 104, such as execution of interrupt handlers, exception handlers, and the like. Thus, for example, in some embodiments the non-secure layer 132 is a VMPL3 layer that executes the operating system, but commands from the operating system to alter data or operations at the VMPL0 layer are ignored unless they match specified security protocols, thereby protecting the guest 104 from exploitation.

In other embodiments the secure layer 120 emulates a central processing unit (CPU) for an operating system located at the non-secure layer 132, and the secure layer 120 performs both interrupt handling and APIC emulation for the non-secure layer 132. This allows an operating system executing at the non-secure layer 132 to employ the event interface 109 as a standard APIC or x2APIC interface, with the secure layer 120 performing event handling as described further herein.

To support virtualization, the processor 101 includes a hypervisor 105 that provides an interface between the hardware resources of the processor 101 and the guests 104 and 106. In particular, the guests 104 and 106 include standard device drivers and other interface software that generates hardware requests and other communications as if the guest were executing on a dedicated computer system. The hypervisor 105 receives the communications from the device drivers and other interface software and based on the communications manages provision of hardware resources to the guests 104 and 106. The hypervisor 105 thus provides a layer between the guests 104 and 106 and the hardware resources of the processor 101 that abstracts the hardware resources so that the guests 104 and 106 can use standard hardware interface software designed for dedicated computer systems.

To further support virtualization, the hypervisor 105 handles at least some aspects of event processing. For example, in response to indication of an interrupt from the I/O control module 107, the hypervisor 105 identifies the guest associated with the interrupt and signals the interrupt to the guest via the event interface 109, along with any associated event handling information, such as an interrupt identifier, a priority level associated with the interrupt, and the like. Conventionally, the hypervisor injects the event hardware information directly into the guest using the event interface 109, and the guest employs the corresponding event handler to process the event based on the injected event handling information. However, as noted above, allowing the hypervisor to inject any event handling information via the event interface 109, or other portion of the event handling path, provides a potential avenue of attack for a malicious hypervisor. Accordingly, the processor 101 restricts the hypervisor from accessing one or more portions of the event processing path.

To illustrate, each layer of the guests 104 and 106 is individually operable in either of two different modes, designated a Restricted Injection Mode and an Alternate Injection Mode. These modes will be described with respect to their implementation at the guest 104, but it will be appreciated that guest 106 operates in a similar fashion. In the Restricted Injection Mode, the hypervisor 105 is not permitted to provide event handling information directly to a non-secure layer of the guest. Instead, the hypervisor 105 signals the occurrence of an event, via the event interface 109, to the secure layer 120 of the guest 104 and stores the event handling information for the event at an event queue 130 stored at the memory 110. In some embodiments, the event handling information includes one or more of: an indicator of the source of the event (e.g., the hardware module that triggered an interrupt), the type of the event (e.g., whether the event is an interrupt or an exception, the type of interrupt or exception, and the like), a priority level of the event, and the like.

In response to the event signal, the secure layer 120 invokes an exception handler to access the event handling information at the event queue 130. Via the exception handler, the secure layer 120 determines if the event control information complies with specified security protocols and, if so, provides the event handling information to the non-secure layer 132 for normal processing. For example, in some embodiments the secure layer 120 determines whether the event handling information matches expected hardware behavior of the processor 101. Thus, in some embodiments the secure layer 120 compares one or more of the event priority level, the event type, the event source, the event identifier, and the like, to corresponding specified ranges of values. If any of the event information is outside of the corresponding specified range, the secure layer 120 does not signal an event to the non-secure layer 132, nor does the secure layer 120 provide the event handling information to the non-secure layer 132. In some embodiments, the secure layer 120 takes additional remedial action, such as signaling a potential attempted security breach to a user or other computer system via a network, halting execution of the guest 104, and the like.

If the event handling information complies with the specified security protocols, the secure layer 120 signals the event, with the event handling information, to the event interface 109. In response, the event interface 109 notifies the non-secure layer 132 of the event and provides the event handling information to the non-secure layer 132. The non-secure layer 132 then uses the event handling information to process the event, such as by invoking an exception handler for the event. Thus, the event handling information is first reviewed by the secure layer 120 before the information is allowed to be passed, via the event interface 109, to the non-secure layer 132 for processing. Restricted Injection Mode is described further below with respect to FIGS. 2 and 3.

In the Alternate Injection Mode, a layer of the guest 104 (e.g., non-secure layer 132) processes the event handling information using event control information 118. The event control information 118 is information that controls the event interface 109. For example, in some embodiments the event control information 118 includes task priority register (TPR) information that sets the priority level of events that are permitted to be processed. If an event provided by the hypervisor 105 has a priority level lower than the TPR information, the event is not processed, thereby protecting the guest 104 from a malicious attack.

In some embodiments, the event control information 118 is stored at an encrypted region of the memory 110, wherein the data stored at the encrypted region is encrypted with a key associated with the guest 104. The key is unknown to the hypervisor 105, thereby preventing the hypervisor 105 from changing the event control information 118, and further protecting the guest 104. The Alternate Injection Mode is further described below with respect to FIGS. 4 and 5.

To set the security mode for the individual layers of the guests 104 and 106, the processor core 102 includes a mode control register 111. The mode control register 111 includes a plurality of fields, with each field setting the security mode for a corresponding guest level, thereby allowing the security mode for different guest levels to be set independently. Thus, for example, in some embodiments the secure layer 120 is in the Restricted Injection Mode concurrently with the non-secure layer 132 being in the Alternate Injection Mode. In some embodiments, the mode control register 111 is programmable only by a secure layer of a guest (e.g., secure layer 120), and is not programmable by the hypervisor 105, thereby further protecting the event processing path of the processor 101. Further, in some embodiments the mode control register 111 does not permit both the Restricted Injection Mode and the Alternate Injection Mode to be in effect at the same time for the same guest layer.

In some embodiments, the security of the guest 104 is enhanced by placing the secure layer 120 in the Restricted Injection Mode and the non-secure layer 132 is placed in the Alternate Injection Mode. Under this arrangement, the hypervisor 105 signals an event (e.g., the event 108) to the event interface 109 and stores the corresponding event handling information at the event queue 130. In response to the event signal, the secure layer 120 (in the Restricted Injection Mode) retrieves the event handling information from the event queue 130 and determines if the event handling information complies with specified security protocols. If not, the secure layer 120 does not signal the event to the event interface 109.

If the event handling information matches the security protocols, the secure layer 120 stores event control information for the event at the encrypted region of the memory 110, as event control information 118. The secure layer 120 provides the event control information 118 to the event interface 109. In response, and responsive to the non-secure layer 132 being in the Alternate Injection Mode, the event interface 109 accesses the event control information 118, decrypts the event control information, and uses the decrypted control information and the event handling information to process the event, such as by requesting the non-secure layer 132 to execute an event handler (e.g., an interrupt or exception handler) associated with the event. Thus, the event handling is managed via the standard interface provided by the event interface 109, but is invoked by the secure layer 120, rather than directly by the hypervisor 105. This allows the non-secure layer 132 to handle and respond to events in a standard way, without requiring redesign of the software executing at the non-secure layer 132 or of the event interface 109.

Figure 2:
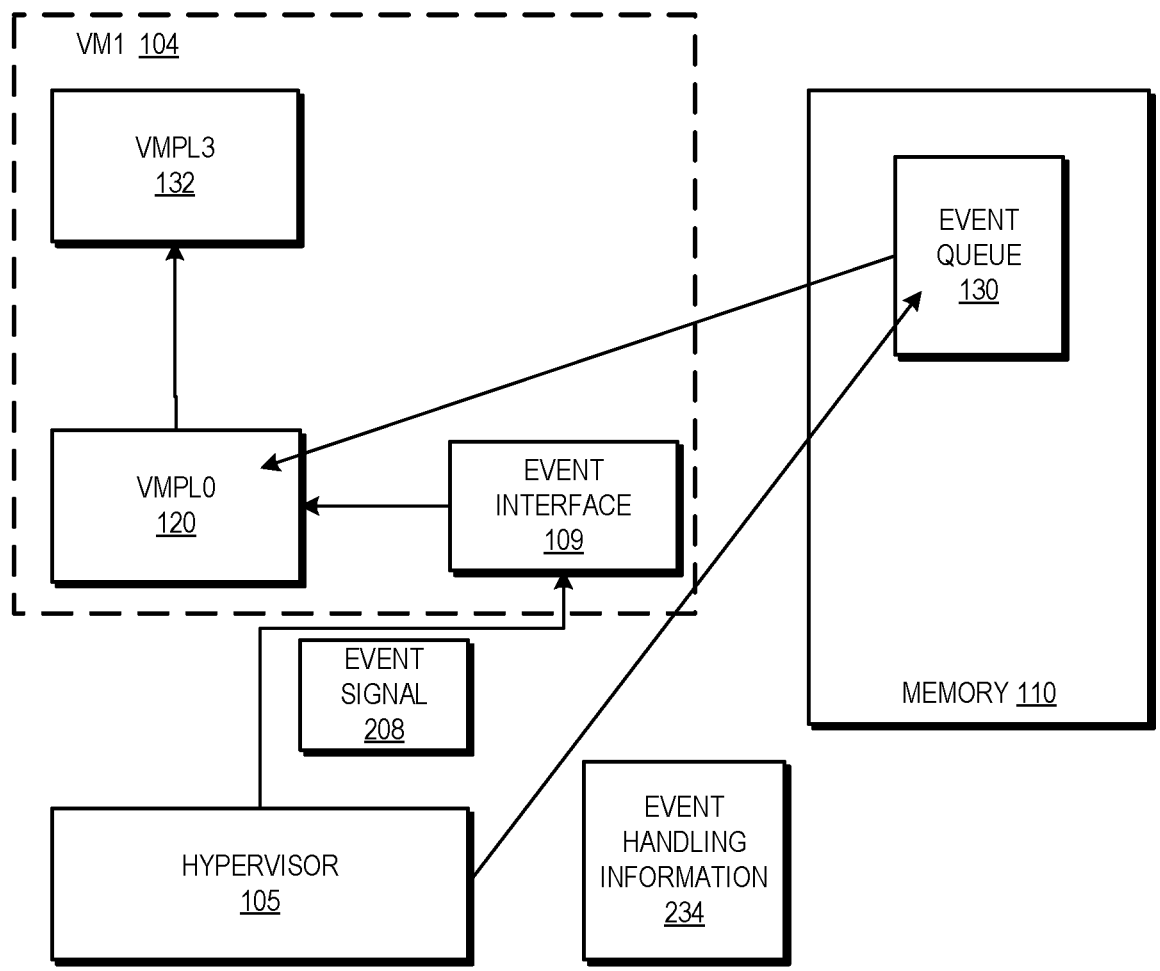
FIG. 2 is a block diagram illustrating an example of the computer system of FIG. 1 employing a secure layer of a virtual machine to access an event queue in response to a signal from the hypervisor in accordance with some embodiments.

FIG. 2 illustrates an example of event processing in the Restricted Injection Mode at the processor 101 in accordance with some embodiments. In the illustrated example, the virtual machine 104 includes two layers: the secure layer 120 and the non-secure layer 132. As described above, the secure layer 120 is a secure portion of the guest 104 that is protected from modification by the non-secure layer 132, by the hypervisor 105, and by other non-secure entities. The non-secure layer 132 is a layer of the guest 104 that executes the guest operating system and other programs, and is generally accessible by other entities, such as other programs or layers of the guest 104.

In operation, the hypervisor 105 receives an indication of an event (an interrupt or exception). The indication further includes event information, such as the type of event, an indicator of the guest to which the event is directed, and the like. In response to the indication of the event, the hypervisor 105 generates additional event information, such as an identifier of the device that generated the event, a priority level of the event, and the like. The hypervisor 105 stores the event handling information 234 at the event queue 130 stored at the memory 110.

In addition, in response to the event, the hypervisor provides an event signal 208 to the event interface 109. In some embodiments, the event signal 208 is a simple exception signal (e.g., an x86 exception signal) that does not include the event handling information 234 or any indication of the type or source of the event, but instead only signals that an event has occurred. In response to the event signal 208, the event interface notifies the guest 104. In response, the secure layer 120 executes an event handler to access the event queue 130 at the memory 110 to retrieve the event handling information 234. In some embodiments, the secure layer 120 reviews the event handling information 234 for compliance with specified security protocols, such as ensuring that the source and type of event are of an expected source and type, that a priority level of the event complies with TPR information, and the like. If the event handling information 234 fails to comply with the security protocols, the secure layer 120 does not signal the event to the event interface 109 for processing, thereby protecting the guest 104 from a potential attack. In response to the event handling information 234 complying with the security protocols, the secure layer 120 signals the event to the event interface 109 for normal event processing.

Thus, as shown by the above example, in the Restricted Injection Mode the hypervisor 105 is restricted from communicating event information to the non-secure layer 132 directly. Instead, the hypervisor 105 provides relatively simple indications of events to the secure layer 120 and provides event information via an event queue that is accessible only by the secure layer 120 of the guest 104. The non-secure layer 132 is thereby protected from a malicious hypervisor providing event information directly to the non-secure layer 132 and potentially accessing secure information or otherwise manipulating the guest 104.

Figure 3:
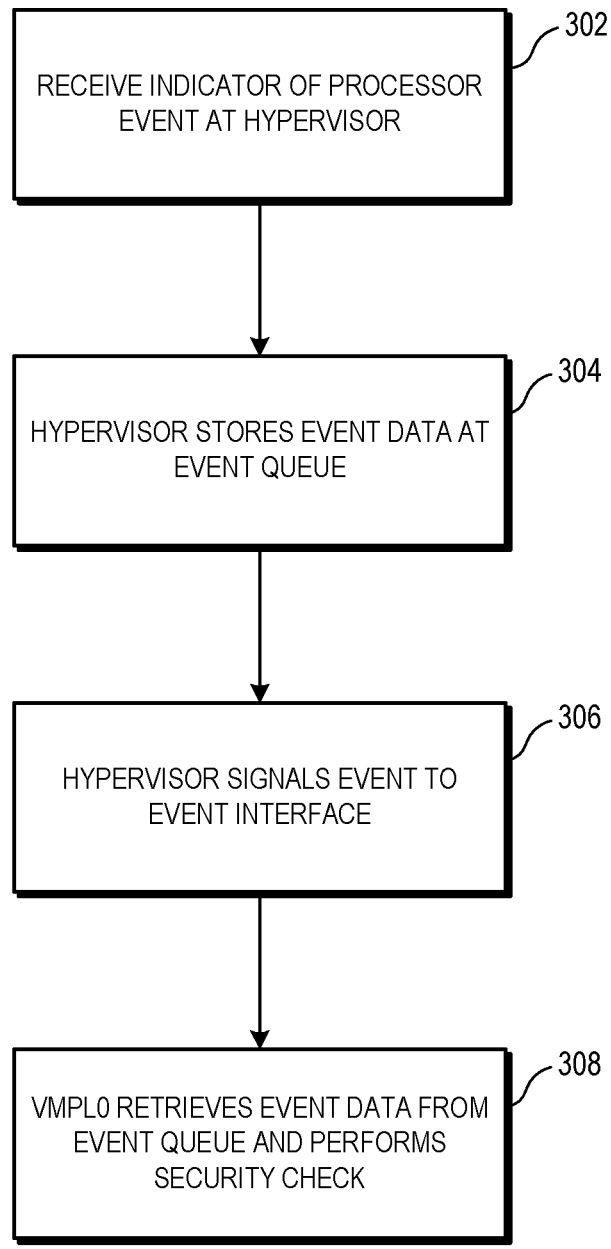
FIG. 3 is a flow diagram of a method of isolating a hypervisor from event handling by employing a secure layer of a virtual machine to access an event queue in accordance with some embodiments.

FIG. 3 is a flow diagram of a method 300 of operating a guest layer in the Restricted Injection Mode in accordance with some embodiments. For purposes of description, the method 300 is described with respect to an example implementation at the processing system 100 of FIG. 1. At block 302, the hypervisor 105 receives an indication of a processor event from a hardware resource of the processor 101, such as from the I/O control module 107. In response, the hypervisor 105 determines event information associated with the event, such as the resource that generated the event, the guest to which the event is directed, a priority level associated with the event, and the like. At block 304, the hypervisor 105 stores the event information at the event queue 130, located at the memory 110.

At block 306, the hypervisor 105 provides a signal to the event interface 109, indicating the occurrence of an event, wherein the signal indicates the guest to which the event is targeted. Thus, if the event is targeted to the guest 104, the hypervisor 105 provides a signal indicating the event to the event interface 109. In some embodiments, the event interface ignores any event information provided by the hypervisor 105 with the signal. Thus, the signal acts only as a "doorbell", indicating to the guest that an event has occurred, without any associated event information.

At block 308, in response to the signal from the hypervisor 105, the event interface 109 notifies the secure layer of the event. In response, the secure layer 120 accesses the event queue 130 and retrieves the event information. If the event information complies with event security protocols, the secure layer 120 provides the event information to the non-secure layer 132, such as by indicating the event to the event interface 109 of the processor 101. The non-secure layer 232 executes an exception handler to process the event. If the event information does not comply with security protocols, the secure layer 120 does not signal the event to the event interface 109, and the event is therefore not processed, thereby protecting the guest 104 from exploitation.

Figure 4:
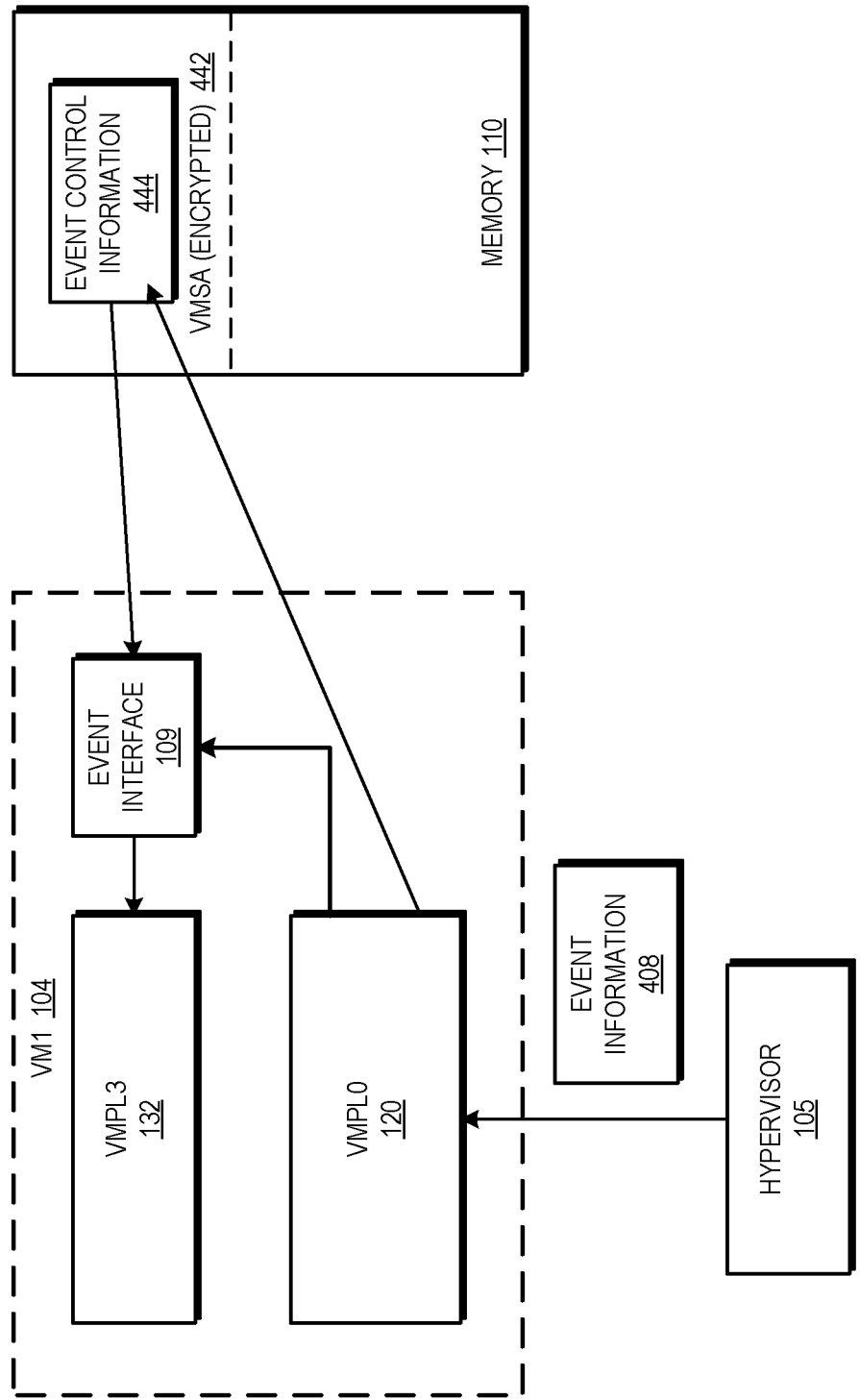
FIG. 4 is a block diagram illustrating an example of the computer system of FIG. 1 employing a secure region of memory to store event control information in accordance with some embodiments.

FIG. 4 illustrates an example of event processing in the Alternate Injection Mode at the processor 101 in accordance with some embodiments. In the illustrated example, similar to the example of FIG. 2, the virtual machine 104 includes two layers: the secure layer 120 and the non-secure layer 132. As described above, the secure layer 120 is a secure portion of the guest 104 that is protected from modification by the non-secure layer 232, by the hypervisor 105, and by other non-secure entities. As in the example of FIG. 2, the non-secure layer 132 is a layer of the guest 104 that executes the guest operating system and other programs and is generally accessible by other programs or layers of the guest 104.

In addition, in the illustrated example the memory 110 includes an encrypted region, designated Virtual Machine State Area (VMSA) region 442. The VMSA region 442 stores data encrypted with a key that is uniquely associated with the guest 104. In some embodiments, the key is available for use only by the secure layer 120 and is not available for use by the hypervisor 105. The secure layer 120 thus manages all accesses to the VMSA region 442. In particular, the secure layer 120 manages writing and reading of data to and from the VMSA region 442 by encrypting and decrypting data for writing and reading, respectively, using the guest-specific key. In some embodiments, the encrypting and decrypting of data is implemented by dedicated hardware (not shown) of the processor 101 at the request of the secure layer 120. The guest-specific key is unknown and inaccessible to the hypervisor 105, and the data stored at the VMSA region 442 is therefore inaccessible to the hypervisor 105.

The VMSA region 442 stores event control information 444 that governs one or more of what events are processed by the guest 104 and how those events are processed. For example, in some embodiments the event control information 444 stores TPR information that indicates the minimum priority level of events that are permitted to be processed by an operating system of the guest 104. The operating system sets the TPR level, according to conventional operating system protocols, and indicates the TPR level to the secure layer 120, which stores the TPR level at the event control information 444 as described further below.

In operation, the hypervisor 105 receives an indication of an event from a hardware resource such as the I/O control module 107. In response, the hypervisor 105 determines event information 408 associated with the event. As noted above, the event information 408 includes information such as a priority level associated with the event, the hardware resource that generated the event, the type of event, and the like. The hypervisor 105 provides the event information 408 to the secure layer 120, either directly or via the event queue 130 as described above with respect to FIG. 2.

In response to the event information 408 complying with specified security protocols, the secure layer 120 stores event control information 444 for the event at the VMSA region 442. In some embodiments, the event control information 444 is automatically encrypted by hardware of the processor 101 as the information is stored at the memory 110. In addition, the secure layer 120 signals the event to the event interface 109 along with the event information 408. In response, the event interface 109 accesses the event control information 444 at the VMSA region 442 and processes the event based on the event control information 444 and the event information 408. Thus, in the example of FIG. 4, the hypervisor 105 is restricted from accessing event control information that governs which events are processed and how they are processed, thereby protecting the guest 104 from a malicious hypervisor.

Figure 5:
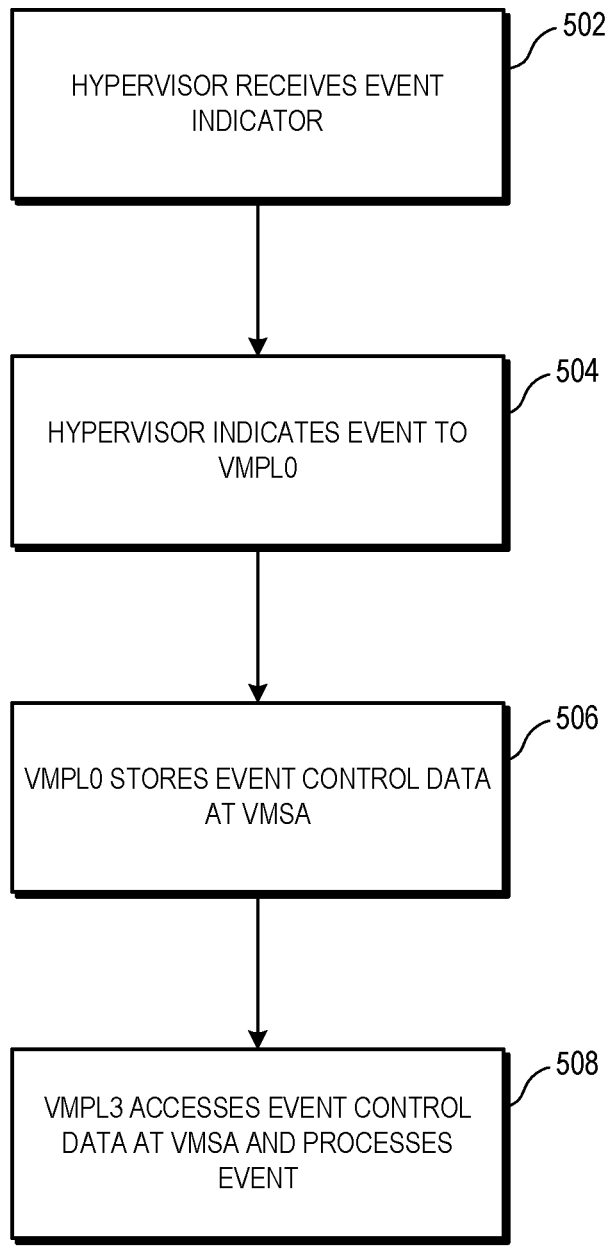
FIG. 5 is a flow diagram of a method of isolating a hypervisor from event handling by employing a secure region of memory to store event control information in accordance with some embodiments.

FIG. 5 illustrates a flow diagram of a method 500 of operating a processor in the Alternate Injection Mode in accordance with some embodiments. The method 500 is described with respect to an example implementation at the processing system 100 of FIG. 1. At block 502, the hypervisor 105 receives an indication of an event from a hardware resource such as the I/O control module 107. In response, at block 504, the hypervisor 105 indicates the event to the secure layer 120. In some embodiments, the secure layer 120 is in the Restricted Injection Mode and, in response to the event indication, retrieves event handling information for the event from the event queue 130. The secure layer 120 determines if the event handling information matches specified security protocols and, if not, prevents further processing of the event. If the event handling information complies with the security protocols, the method proceeds to block 506.

At block 506, the secure layer 120 of the guest 104 stores event control data, such as a task priority level (TPR) as event control information 444 at the VMSA region 442 of the memory 110. Prior to or during the storage process, the secure layer 120 encrypts the event control information 444 with a key associated with the guest 104, wherein the key is unknown and inaccessible to the hypervisor 105.

At block 508, the secure layer 120 of the guest 104 indicates, via the event interface 109 to the non-secure layer 132 that the event information 408 is ready to be processed. In response, the event interface 109 retrieves the encrypted event control information 444 from the VMSA 442, decrypts the information, and uses the decrypted event control information 444 to process the event using a standard event processing protocol.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   receiving, at a guest program, an indication of a processor event from a hypervisor;
   in response to receiving the indication of the processor event, accessing event handling information at a specified region of memory; and processing the processor event based on the event handling information, wherein:
the guest program comprises a secure layer and a non-secure layer; and
receiving the indication of the processor event comprises receiving the indication of the processor event at the secure layer of the guest program; and
wherein the secure layer is to provide information based on the processor event to the non-secure layer.

2. The method of claim 1, wherein:
accessing event handling information comprises the secure layer accessing the event handling information.

3. The method of claim 1, wherein:
receiving the indication of the processor event comprises receiving the indication of the processor event at an event interface of a processor.

4. The method of claim 1, wherein:
the specified region of memory comprises a region of memory that is inaccessible to the hypervisor.

5. The method of claim 4, wherein the specified region of memory is an encrypted region of memory.

6. The method of claim 4, wherein the event handling information comprises task priority register (TPR) information.

7. A method, comprising:
setting a state of a security register at a processor; and
based on the state of the security register, restricting notification of events by a hypervisor to a non-secure layer of a guest program, the events including at least one of an interrupt and an exception, wherein restricting notification of events comprises:
receiving an indication of an event from the hypervisor at a secure layer of the guest program; and
in response to receiving the indication, accessing event data at a specified region of memory; and
wherein the secure layer is to provide information based on the event to the non-secure layer.

8. The method of claim 7, wherein:
the hypervisor stores the event data at the specified region of memory.

9. The method of claim 7, wherein restricting notification of events comprises:
in response to the indication, accessing a specified region of memory to retrieve event control information, the specified region of memory inaccessible to the hypervisor.

10. The method of claim 9, wherein the specified region of memory is encrypted with a key associated with the guest program.

11. The method of claim 9, wherein the event control information comprises task priority register (TPR) information.

12. A processor, comprising:
a processor core configured to execute a guest program;
a hypervisor configured to provide an indication of a processor event to the guest program; and
the guest program configured to, in response to receiving the indication of the processor event, access event handling information at a specified region of memory and to process the processor event based on the event handling information, wherein the guest program comprises a secure layer configured to receive the indication of the processor event, and a non-secure layer; and
wherein the secure layer is to provide information based on the processor event to the non-secure layer.

13. The processor of claim 12, wherein:
the secure layer is configured to access the event handling information.

14. The processor of claim 12, wherein:
receiving the indication of the processor event comprises receiving the indication at an event interface of the processor.

15. The processor of claim 12, wherein:
the specified region of memory comprises a region of memory that is inaccessible to the hypervisor.

16. The processor of claim 15, wherein the specified region of memory is an encrypted region of memory.

17. The processor of claim 16, wherein the event handling information comprises task priority register (TPR) information.

* * * * *